(12) United States Patent
Alexander et al.

(10) Patent No.: US 11,299,084 B2
(45) Date of Patent: Apr. 12, 2022

(54) SELECTIVELY RIGIDIZABLE MEMBRANE

(71) Applicants: GM Global Technology Operations LLC, Detroit, MI (US); Regents of the University of Michigan, Ann Arbor, MI (US)

(72) Inventors: Paul W. Alexander, Ypsilanti, MI (US); Wonhee M. Kim, Royal Oak, MI (US); Jonathan E. Luntz, Ann Arbor, MI (US); Diann Brei, Milford, MI (US); Koray Benli, Ann Arbor, MI (US); Sarah M. Sober, Pinckney, MI (US); Laura Alejandra Giner Munoz, Ann Arbor, MI (US); Nancy L. Johnson, Northville, MI (US)

(73) Assignees: GM GLOBAL TECHNOLOGY OPERATIONS LLC, Detroit, MI (US); REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 284 days.

(21) Appl. No.: 16/654,292

(22) Filed: Oct. 16, 2019

(65) Prior Publication Data

US 2021/0114507 A1 Apr. 22, 2021

(51) Int. Cl.
*B60P 7/06* (2006.01)
*B60P 7/04* (2006.01)
*B33Y 80/00* (2015.01)

(52) U.S. Cl.
CPC .............. *B60P 7/06* (2013.01); *B60P 7/04* (2013.01); *B33Y 80/00* (2014.12)

(58) Field of Classification Search
CPC ................ B60P 7/04; B60P 7/06; B60P 7/065
(Continued)

(56) References Cited

U.S. PATENT DOCUMENTS 5,159,726 A 11/1992 Bloch et al.
9,777,753 B2 * 10/2017 Niiyama ............. H04M 1/0202
(Continued)

FOREIGN PATENT DOCUMENTS

CN 112455559 A * 3/2021 ............. B62D 37/02
CN 112589790 A * 4/2021
(Continued)

*Primary Examiner* — Hilary L Gutman
(74) *Attorney, Agent, or Firm* — Vivacqua Crane PLLC

(57) ABSTRACT

A selectively rigidizable membrane for cargo management comprises a vacuum bladder, and a first architectural layer and a second architectural layer, each of the first and second architectural layers including a plurality of tiles interconnected by flexural elements, each of the tiles of the first and second architectural layers including at least one constraining element extending therefrom, wherein, when atmospheric pressure is present within the vacuum bladder, the first and second architectural layers are slidably moveable relative to one another and the membrane is flexible, and further wherein, when negative pressure is applied to the vacuum bladder, the first and second architectural layers are forced into engagement with one another, the constraining elements of the first and second architectural layers providing mechanical interference and preventing sliding movement of the first and second architectural layers relative to one another, causing the membrane to become substantially rigid.

20 Claims, 7 Drawing Sheets

(58) Field of Classification Search
USPC .......................................................... 410/118
See application file for complete search history.

(56) References Cited

U.S. PATENT DOCUMENTS

| | | | |
|---|---|---|---|
| 10,597,917 B2* | 3/2020 | Sutherland | E05C 17/025 |
| 11,125,253 B2* | 9/2021 | Alexander | F15B 15/10 |
| 2012/0325965 A1* | 12/2012 | Bright | B64C 3/56 |
| | | | 244/123.11 |
| 2019/0106030 A1* | 4/2019 | Kim | B60N 2/90 |
| 2021/0071690 A1* | 3/2021 | Alexander | B62D 35/00 |

FOREIGN PATENT DOCUMENTS

| | | | |
|---|---|---|---|
| DE | 102015001373 A1 | 4/2016 | |
| WO | WO-2015161028 A1 * | 10/2015 | ........... A61F 5/0102 |

* cited by examiner

SELECTIVELY RIGIDIZABLE MEMBRANE

INTRODUCTION

The present disclosure relates to cargo management, more particularly to a selectively rigidizable membrane that can be used to secure cargo.

Safely and easily managing loose cargo during transportation can be challenging. Cargo nets and dividers do not always provide adequate support to ensure that items to not fall over and roll around during transport. This can cause damage to the items and distraction.

Therefore, while current cargo management devices achieve their intended purpose, there is a need for a new and improved cargo management device that is adaptable to different cargo, provides secure retention capability to keep cargo in place, and is intuitive and easy to use. other applications and industries.

SUMMARY

According to several aspects of the present disclosure, a selectively rigidizable membrane for cargo management comprises a vacuum bladder, and a first architectural layer and a second architectural layer, each of the first and second architectural layers including a plurality of tiles interconnected by flexural elements, wherein, when atmospheric pressure is present within the vacuum bladder, the first and second architectural layers are slidably moveable relative to one another and the membrane is flexible, and further wherein, when negative pressure is applied to the vacuum bladder, the first and second architectural layers are forced into engagement with one another, frictional engagement of the first and second architectural layers preventing sliding movement of the first and second architectural layers relative to one another, causing the membrane to become substantially rigid.

According to another aspect, each of the tiles of the first and second architectural layers includes at least one constraining element extending therefrom, further wherein, when negative pressure is applied to the vacuum bladder, the first and second architectural layers are forced into engagement with one another, the constraining elements of the first and second architectural layers providing mechanical interference and preventing sliding movement of the first and second architectural layers relative to one another, causing the membrane to become substantially rigid.

According to another aspect, the membrane includes at least two zones, the tiles of the first and second architectural layers within a first zone adapted to provide defined flexibility characteristics and the tiles of the first and second architectural layers within a second zone adapted to provide defined flexibility characteristics different from the first zone, the first and second zones being independently rigidizable.

According to another aspect, the tiles of the first and second architectural layers within the first zone are shaped and sized differently than the tiles of the first and second architectural layers within the second zone.

According to another aspect, the tiles of the first and second architectural layers are adapted to provide defined fold lines for the membrane.

According to another aspect, the vacuum bladder includes a first airtight layer and a second airtight layer, the first and second airtight layers being sealed to one another around along a perimeter, the first and second architectural layers being positioned between the first and second airtight layers within the perimeter.

According to another aspect, the tiles of the first architectural layer are mounted onto an inner surface of the first airtight layer of the vacuum bladder and the tiles of the second architectural layer are mounted onto an inner surface of the second airtight layer of the vacuum bladder.

According to another aspect, the first architectural layer includes a first intermediate layer, the tiles of the first architectural layer mounted onto the first intermediate layer and the second architectural layer includes a second intermediate layer, the tiles of the second architectural layer mounted onto the second intermediate layer.

According to another aspect, the flexural elements comprise portions of the first and second intermediate layers that extend between the tiles mounted onto the first and second intermediate layers.

According to another aspect, the first and second intermediate layers each include a plurality of spaced holes formed therein, the tiles of the first and second architectural layers including a base, at least one constraining element extending therefrom and a securing ring adapted to snap onto the at least one constraining element, further wherein the at least one constraining element of each tile extends through one of the holes formed within one of the first and second intermediate layers and the securing ring snaps onto the tile to secure the tile onto the intermediate layer.

According to another aspect, the tiles of the first and second architectural layers are formed onto the first and second intermediate layers by additive manufacturing.

According to another aspect, the flexibility of the membrane can be varied by varying the negative pressure that is applied to the vacuum bladder.

According to another aspect, the selectively rigidizable membrane further includes tertiary layer positioned between the first and second architectural layers, the tertiary layer adapted to aid sliding movement of the first and second architectural layers relative to one another when negative pressure is not applied to the vacuum bladder.

According to several aspects of the present disclosure, a selectively rigidizable membrane for cargo management comprises a vacuum bladder, the vacuum bladder including a first airtight layer and a second airtight layer, the first and second airtight layers being sealed to one another along a perimeter, the first and second architectural layers being positioned between the first and second airtight layers within the perimeter, first and second architectural layers positioned between the first and second airtight layers within the perimeter of the vacuum bladder, each of the first and second architectural layers including a plurality of tiles interconnected by flexural elements, each of the tiles of the first and second architectural layers including at least one constraining element extending therefrom, a tertiary layer positioned between the first and second architectural layers, the tertiary layer adapted to aid sliding movement of the first and second architectural layers relative to one another when negative pressure is not applied to the vacuum bladder, and a port adapted to allow pressure to be applied to the interior of the vacuum bladder, wherein, when atmospheric pressure is present within the vacuum bladder, the first and second architectural layers are slidably moveable relative to one another and the membrane is flexible, and when negative pressure is applied to the vacuum bladder, the first and second architectural layers are forced into engagement with one another, the constraining elements of the first and second architectural layers providing mechanical interference and preventing sliding movement of the first and second architectural layers relative to one another, causing the membrane to become substantially rigid, the rigidity of the membrane being selectively variable depending on the level of negative pressure applied to the interior of the vacuum bladder.

According to another aspect, the membrane includes a plurality of independently rigidizable zones, the tiles of the first and second architectural layers within each zone having dimensional features adapted to provide defined flexibility characteristics, wherein the flexibility characteristics of each zone vary based on the dimensional features of the tiles.

According to another aspect, the tiles of the first and second architectural layers are adapted to provide defined fold lines for the membrane.

According to another aspect, the tiles of the first architectural layer are mounted onto an inner surface of the first airtight layer of the vacuum bladder and the tiles of the second architectural layer are mounted onto an inner surface of the second airtight layer of the vacuum bladder.

According to another aspect, the first architectural layer includes a first intermediate layer, the tiles of the first architectural layer mounted onto the first intermediate layer and the second architectural layer includes a second intermediate layer, the tiles of the second architectural layer mounted onto the second intermediate layer, the flexural elements of the first and second architectural layers comprising portions of the first and second intermediate layers that extend between the tiles mounted thereon.

According to another aspect, the first and second intermediate layers each include a plurality of spaced holes formed therein, the tiles of the first and second architectural layers including a base, the at least one constraining element extending therefrom and a securing ring adapted to snap onto the at least one constraining element, further wherein the at least one constraining element of each tile extends through one of the holes formed within one of the first and second intermediate layers and the securing ring snaps onto the tile to secure the tile onto the intermediate layer.

According to another aspect, the tiles of the first and second architectural layers are formed onto the first and second intermediate layers by additive manufacturing.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
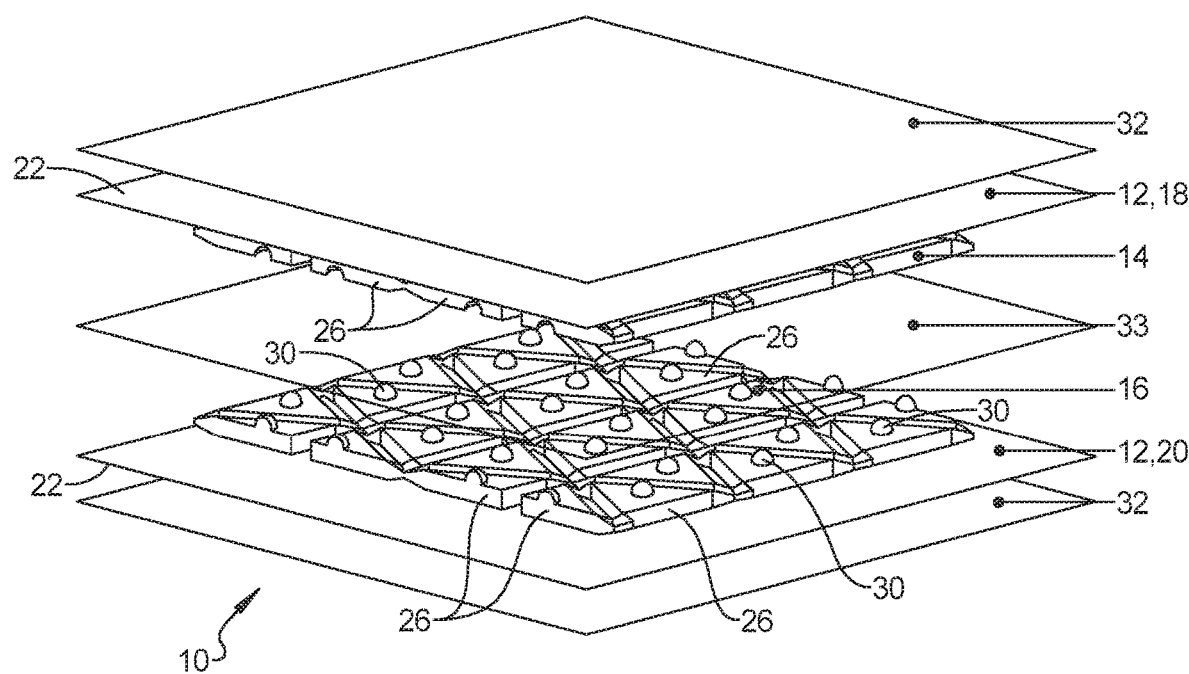
FIG. 1 is an exploded view of a selectively rigidizable membrane according to an exemplary embodiment.

Referring to FIG. 1, a selectively rigidizable membrane 10 for cargo management comprises a vacuum bladder 12, and first and second architectural layers 14, 16 positioned within the vacuum bladder 12. The vacuum bladder 12 includes a first airtight layer 18 and a second airtight layer 20. The first and second airtight layers 18, 20 are sealed to one another along a perimeter 22, defining an airtight interior 24. The first and second architectural layers 14, 16 are positioned between the first and second airtight layers 18, 20 within the airtight interior 24 of the vacuum bladder 12. In an exemplary embodiment, the membrane 10 includes a plurality of vacuum bladders in a stacked configuration. Each of the vacuum bladders is independently selectively actuatable to provide varying levels of rigidity when the membrane is rigidized.

Each of the first and second architectural layers 14, 16 includes a plurality of tiles 26 interconnected by flexural elements 28. The flexural elements allow at least one type of relative motion between adjacent tiles on an architectural layer 14, 16, and more than one degree of freedom. By way of non-limiting examples, the flexural elements may allow relative motion between adjacent tiles that is rotary in-plane, rotary out-of-plane, translational-in-plane, and translation out-of-plane. The flexural elements are adapted to allow sufficient range of motion to enable bending, curving and shaping of the overall surface, while limiting the range of motion sufficiently to maintain the orderly relative arrangement of the tiles 26.

Each of the tiles 26 of the first and second architectural layers 14, 16 also includes at least one constraining element 30 extending therefrom. The vacuum bladder 12, with the first and second architectural layers 14, 16 positioned therein, is encased within a decorative cover 32. The decorative cover 32 may be a fabric or plastic that provides an attractive appearance for the membrane 10. In an exemplary embodiment, a tertiary layer 33 is positioned between the first and second architectural layers 14, 16. The tertiary layer 33 is adapted to aid sliding movement of the first and second architectural layers 14, 16 relative to one another when negative pressure is not applied to the vacuum bladder 12.

A port 34 extends through the decorative cover 32, and the vacuum bladder 12 to allow fluid communication with the interior 24 of the vacuum bladder 12. The port 34 is adapted to connect to a vacuum system to allow negative pressure to be selectively applied to the interior of the vacuum bladder 12, or to connect to a pump to allow positive pressure to be selectively applied to the interior of the vacuum bladder 12.

Figure 2A:
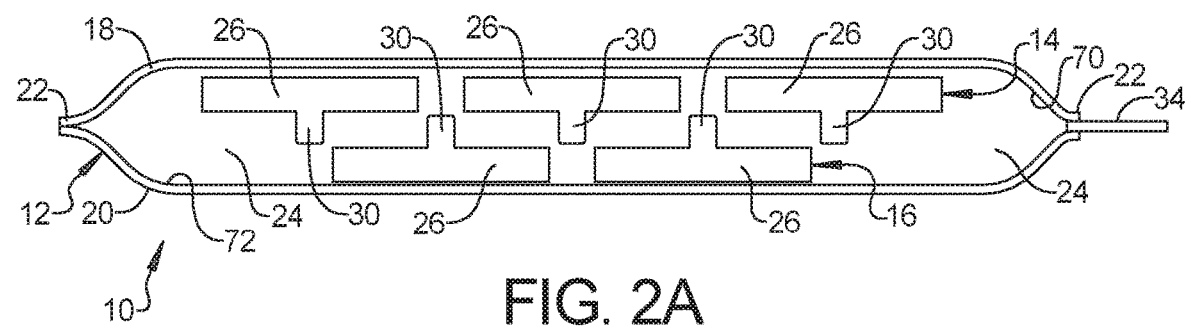
FIG. 2A is a schematic side sectional view of a selectively rigidizable membrane according to an exemplary embodiment, wherein negative pressure is not applied to a vacuum bladder.

Referring to FIG. 2A, when atmospheric pressure is present within the vacuum bladder 12, the first and second architectural layers 14, 16 are slidably moveable relative to one another. Sliding movement of the first and second architectural layers 14, 16 relative to one another allows bending and flexing of the membrane 10. It should be understood that the membrane 10 would also exhibit flexible characteristics when positive pressure is applied.

Figure 2B:
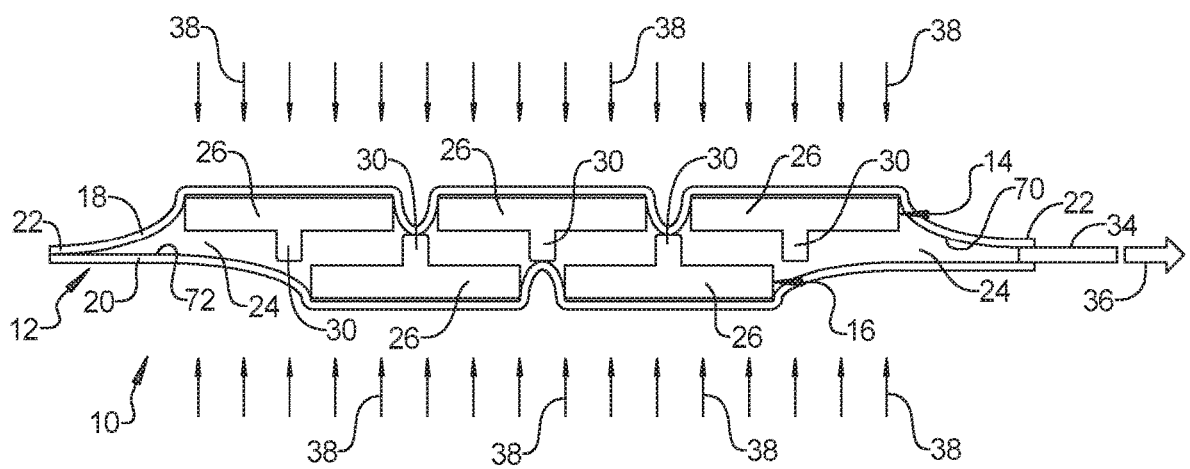
FIG. 2B is a schematic side sectional view of the selectively rigidizable membrane shown in FIG. 2A, wherein negative pressure is not applied to a vacuum bladder.

Referring to FIG. 2B, when negative pressure is applied to the vacuum bladder 12, as indicated by arrow 36, the vacuum bladder 12 forces the first and second architectural layers 14, 16 into engagement with one another, as indicated by arrows 38. Frictional engagement between the first and second architectural layers 14, 16 restrict the first and second architectural layers 14, 16 from sliding relative to one another, thereby rigidizing the membrane 10 and causing the membrane 10 to retain the shape the membrane 10 is in when negative pressure is applied. The constraining elements 30 of the first and second architectural layers 14, 16 provide mechanical interference in addition to the frictional engagement of the tiles 26 that provides additional restriction to sliding movement of the first and second architectural layers 14, 16 relative to one another. While either frictional engagement of the first and second architectural layers 14, 16 or mechanical interference from the constraining elements 30 would provide substantial rigidization alone, the combination of frictional resistance and mechanical interference provides improved restriction of movement of the first and second architectural layers 14, 16 relative to one another rigidizes the membrane 10, causing the membrane 10 to maintain whatever shape the membrane 10 was in immediately prior to the application of negative pressure to the vacuum bladder 12. It should be understood that the membrane could include more than a first and second architectural layer 14, 16. In an exemplary embodiment, a plurality of any number of architectural layers may be stacked to create additional layers of frictional engagement. Constraining elements 30 extending from opposing sides of the tiles 26 will engage with constraining elements 30 on adjacent tiles 26 to provide mechanical interference.

In an exemplary embodiment, the first and second airtight layers 18, 20 are attached to one another at spaced intervals within the perimeter 22 in addition to being sealed around the perimeter 22. The attachment points between the first and second airtight layers 18, 20 prevent ballooning of the vacuum bladder 12 when positive pressure is introduced within the vacuum bladder 12. The attachment points will allow the first and second airtight layers 18, 20 to move away from one another sufficiently to relieve frictional engagement between the tiles 26 and to dis-engage mechanical interference of the constraining elements 30, while preventing the first and second airtight layers from separating to a point where the architectural layers can become mis-aligned or fold over onto themselves within the vacuum bladder 12. Additionally, when the pressure within the vacuum bladder 12 is neutral, the attachments points between the first and second airtight layers 18, 20 will prevent distortion of the membrane when being handled. For example, if a user of the membrane 10 lifts the membrane 10 when in a flexible state by pinching the first airtight layer 18, the attachment points between the first and second airtight layers 18, 20 will prevent the second airtight layer 20 from sagging which could result in mis-alignment or folding over of the architectural layers within the vacuum bladder 12.

Figure 3A:
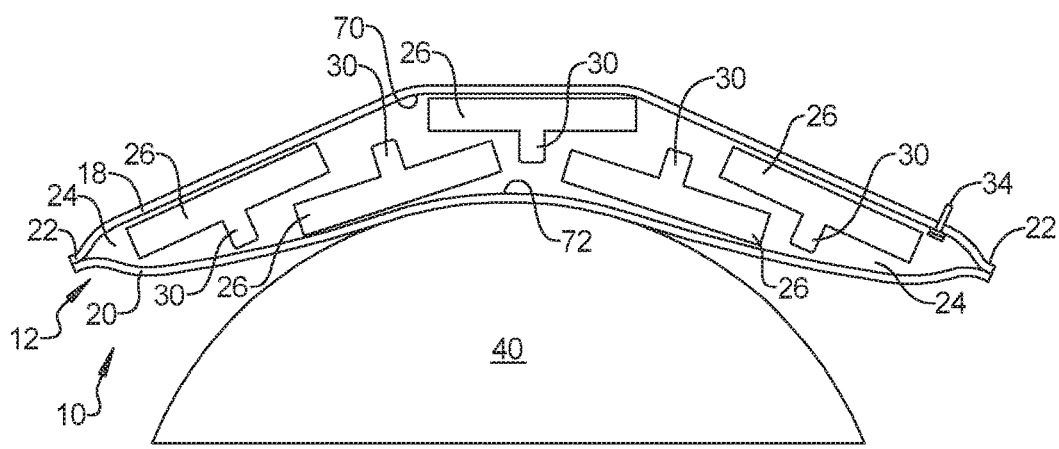
FIG. 3A is a schematic side sectional view of the selectively rigidizble membrane shown in FIG. 2A, wherein the flexible membrane is draped over an item of cargo.

Referring to FIG. 3A, when the membrane 10 is flexible, the membrane 10 can be draped over an item of cargo 40. Once again, the dimensional characteristics of the tiles 26 will determine how flexible the membrane 10 is, and consequently, how closely the membrane 10 will conform to varying shapes of cargo 40, and how tightly the membrane 10 will secure the cargo 40. Space between the tiles 26 and the ability of the tiles 26 in the first architectural layer 14 to move relative to the tiles 26 of the second architectural layer 16 allows angular deflection of the membrane 10. The tiles 26 are free to shift, allowing the membrane 10 to conform to the topography of the cargo 40.

Figure 3B:
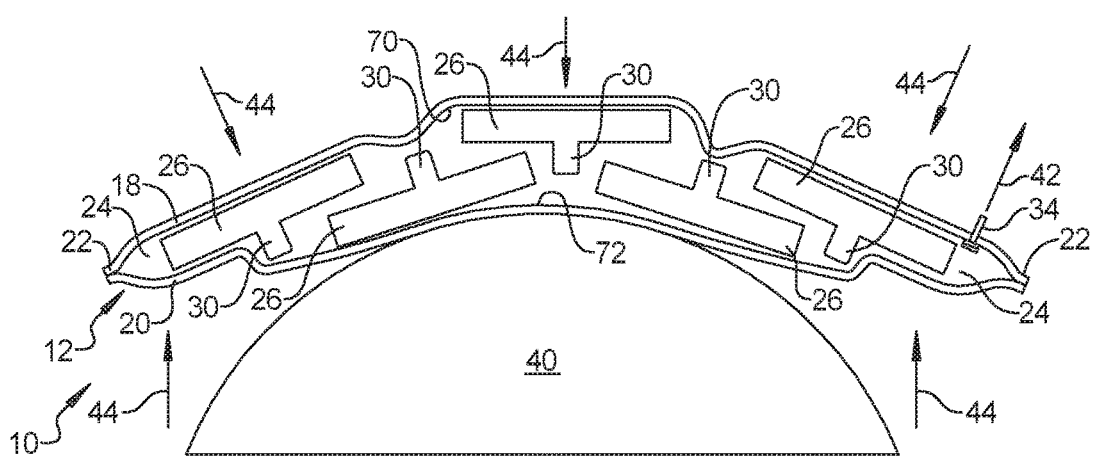
FIG. 3B is a schematic side sectional view of the selectively rigidizble membrane shown in FIG. 3A, wherein the flexible membrane is rigidized over the item of cargo.

Referring to FIG. 3B, when negative pressure is applied to the interior 24 of the vacuum bladder 12, as indicated by arrow 42, the tiles 26 are restricted from relative movement, and the membrane 10 becomes rigid and holds the shape taken when the membrane 10 was draped over the cargo 40. When negative pressure is applied, the first and second airtight layers 18, 20 of the vacuum bladder 12 are pulled inward, as indicated by arrows 44, there is less space between the tiles 26, and the constraining elements 30 keep the tiles 26 in the conformed shape, providing a shell to keep the cargo 40 from shifting. The membrane 10 can be made more or less rigid by varying the amount of negative pressure applied to the vacuum bladder 12. It may be desirable to apply a low level of negative pressure to slightly rigidize the membrane 10 to make the membrane 10 easier to handle while placing around cargo, and increasing the level of negative pressure once the membrane 10 is in place to make it fully rigidized. As the space between the tiles 26 is removed during the application of negative pressure to the interior 24 of the vacuum bladder 12, the membrane 10 will spring back slightly. The amount of spring back is dependent on the geometrical features of the tiles 26. Generally, the spring back is not significant, and the membrane 10 will conform closely enough to the shape of the cargo 40 to secure the cargo 40 during transport.

Depending on the dimensional characteristics of the tiles 26, there is a limit to the flexibility of the membrane 10 when the interior 24 of the vacuum bladder 12 is at atmospheric pressure. In addition, again depending on the dimensional characteristics of the tiles 26, there is a limit to how rigid the membrane 10 will become when a maximum negative pressure is applied to the interior 24 of the vacuum bladder 12. Within those limitations, the relative flexibility or rigidity of the membrane 10 is variable depending on how much negative pressure is applied to the interior 24 of the vacuum bladder 12.

Figure 4A:
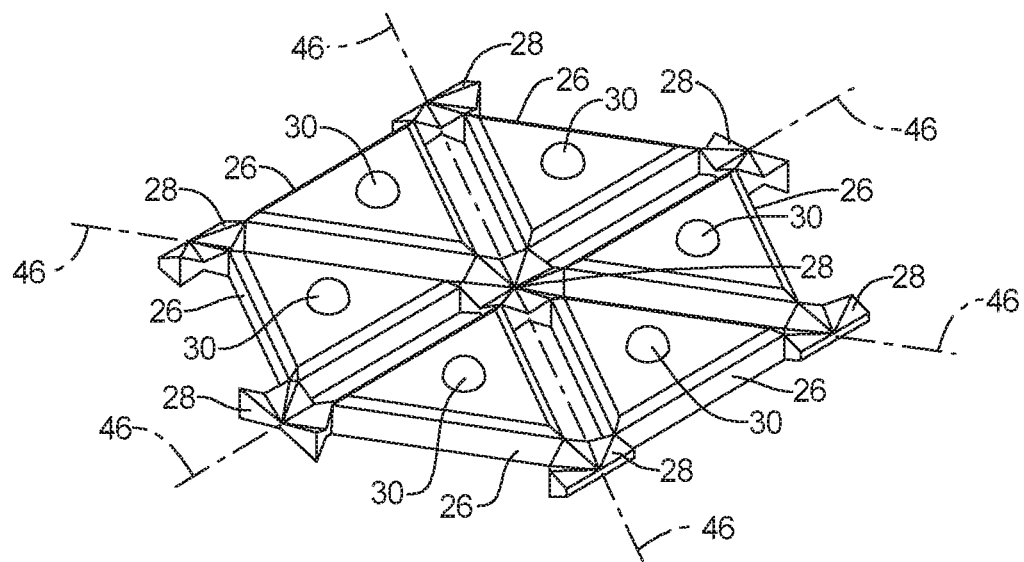
FIG. 4A is an enlarged view of a section of triangular tiles having interconnecting flexural elements.

Referring to FIG. 4A, in an exemplary embodiment, the tiles 26 of the first and second architectural layers 14, 16 are triangular in shape. The flexural elements 28 interconnect the tiles 26 at the three points of the triangular shaped tiles 26. Each tile 26 includes a single constraining element 30. As shown, the constraining elements 30 comprise a semi-spherical protrusion. One feature provided by the triangular shaped tiles 26 is that when the membrane 10 is in the flexible state, the triangular tiles 26 provide defined linear fold lines 46 for the membrane 10.

Figure 5A:
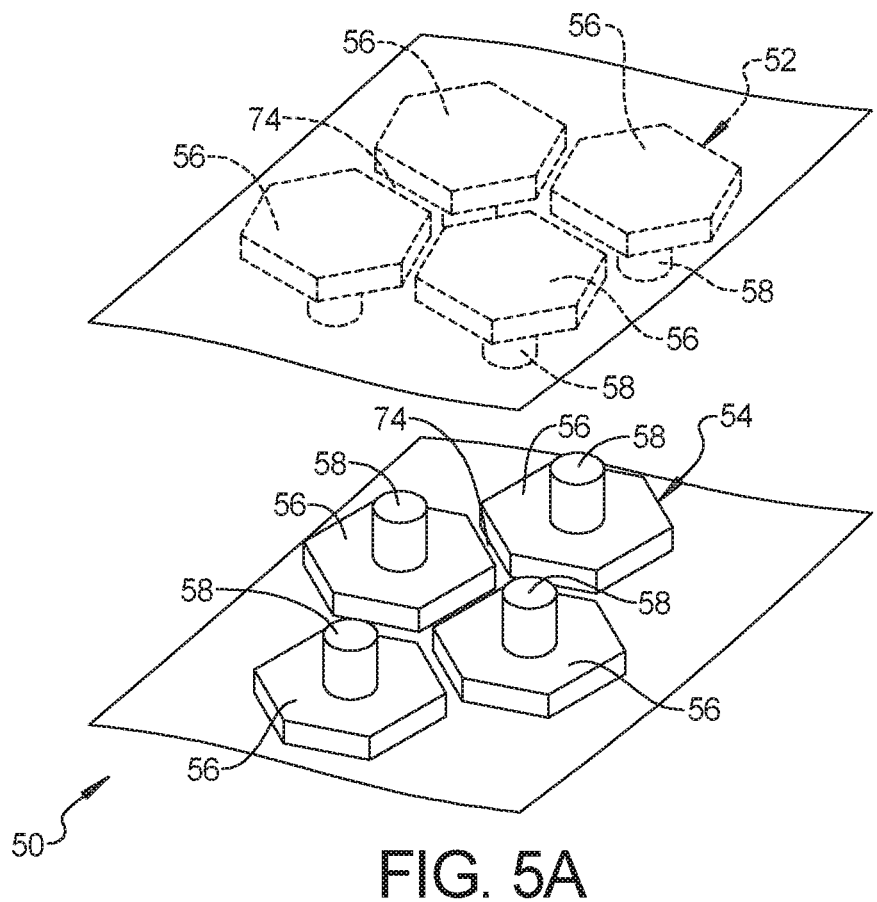
FIG. 5A is a partial view of a portion of a first airtight layer having hex-shaped tiles attached thereto and a portion of a second airtight layer having hex-shaped tiles attached thereto.
Figure 5B:
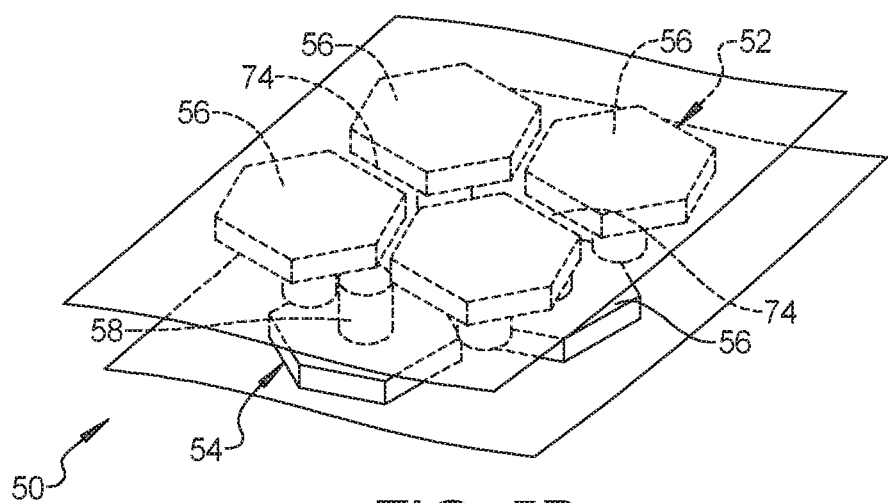
FIG. 5B is a partial view of a portion of the first and second airtight layers shown in FIG. 5A, wherein the first and second airtight layers are brought into engagement with one another.

Referring to FIG. 5A and FIG. 5B, a selectively rigidizable membrane 50 according to another exemplary embodiment includes first and second architectural layers 52, 54 having tiles 56 that are hex-shaped and include cylindrical constraining elements 58.

As stated above, the dimensional features of the tiles 26, 56 control how flexible or rigid the membrane 10, 50 can be. A membrane 10, 50 with triangular tiles 26 that are ⅝ of an inch on a side will provide more flexibility than a membrane 10, 50 with triangular tiles 26 that are 1 inch on a side. Additionally, different shapes of tiles 26, 56 will provide different levels of flexibility and rigidity, as well and providing different degrees of freedom. A membrane 10, 50 can be custom designed to be as flexible or rigid as needed for a particular application.

Figure 8A:
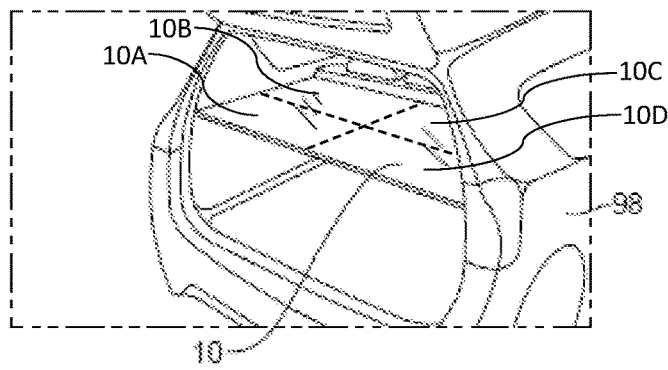
FIG. 8A is a perspective view of an automotive vehicle having a selectively rigidizable membrane according to an exemplary embodiment, wherein the membrane is in a stowed position.

Furthermore, the membrane 10, 50 can be designed with multiple zones. Referring to FIG. 8A, the membrane 10 includes four zones 10A, 10B, 10C, 10D. The tiles 26, 56 of the first and second architectural layers 14, 16, 52, 54 within each zone 10A, 10B, 10C, 10D can have dimensional features that are adapted to provide defined flexibility characteristics. By using different sizes and shapes of tiles 26, 56 within the different zones 10A, 10B, 10C, 10D, the flexibility characteristics of each zone 10A, 10B, 10C, 10D can vary from one another. Alternatively, the tiles 26, 56 of the first and second architectural layers 14, 16, 52, 54 within each zone 10A, 10B, 10C, 10D can have dimensional features that are adapted to provide flexibility characteristics that are the same, but negative pressure can be selectively applied to each zone 10A, 10B, 10C, 10D independently.

The size and shape of the tiles 26, 56, the spacing of the tiles 26, 56 across the first and second architectural layers 14, 16, 52, 54, the dimensional characteristics of the constraining elements 30, 58 that extend from the tiles 26, 56, the number of constraining elements 30, 58 extending from the tiles 26, 56, and the nature of the flexural elements 28 that interconnect the tiles 26, 56 are all tailorable to achieve specific drapability, conformability, settability, rigidizing characteristics suitable for a specific application.

Figure 4B:
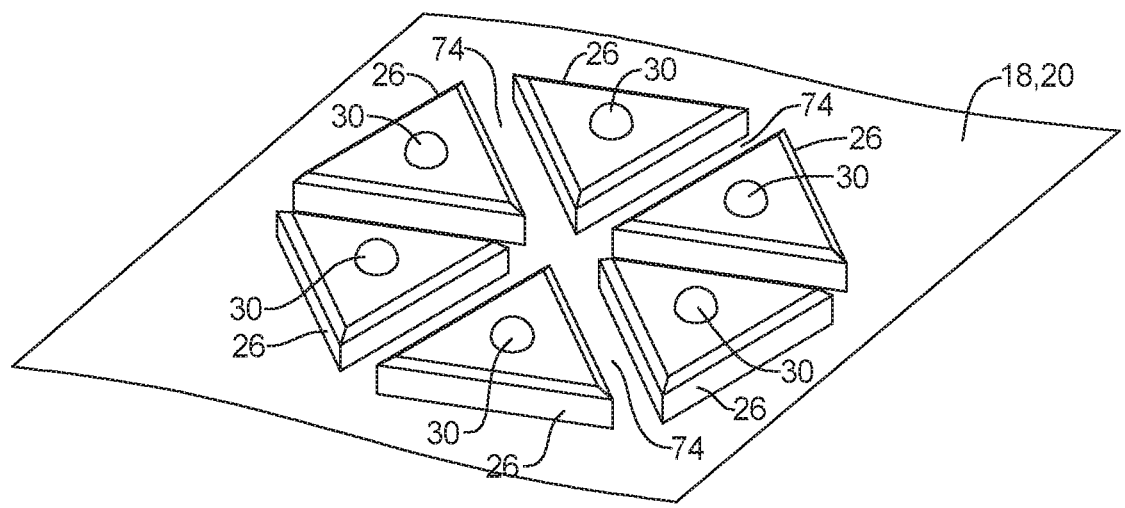
FIG. 4B is an enlarged view of a section of triangular tiles that are directly mounted onto the inner surface of the vacuum bladder.
Figure 6A:
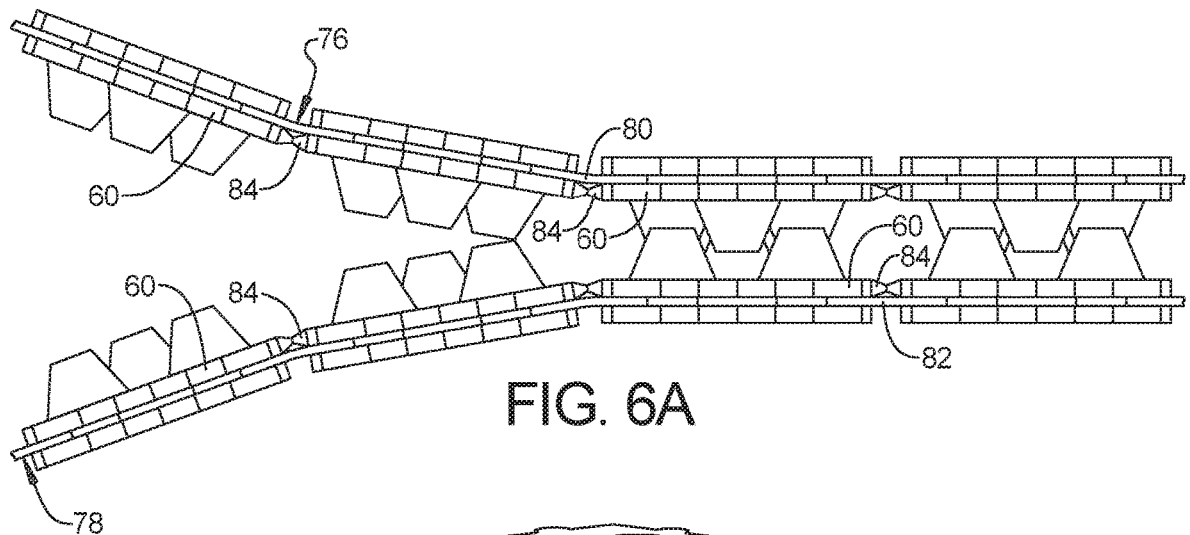
FIG. 6A is a perspective view of first and second intermediate layers with tiles mounted thereon.
Figure 6B:
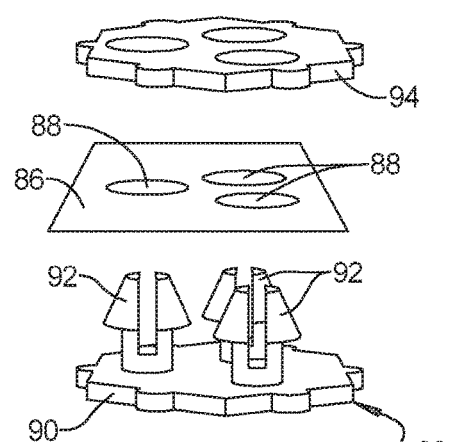
FIG. 6B is an exploded view of an intermediate layer, a tile and snap ring prior to assembly of the snap ring and tile onto the intermediate layer.
Figure 7:
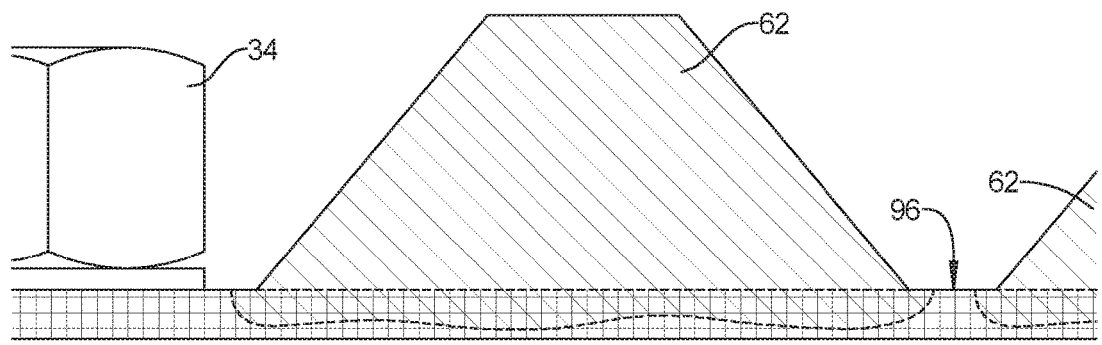
FIG. 7 is a perspective view of a portion of an intermediate layer having tiles formed by additive manufacturing directly onto the intermediate layer.
Figure 9A:
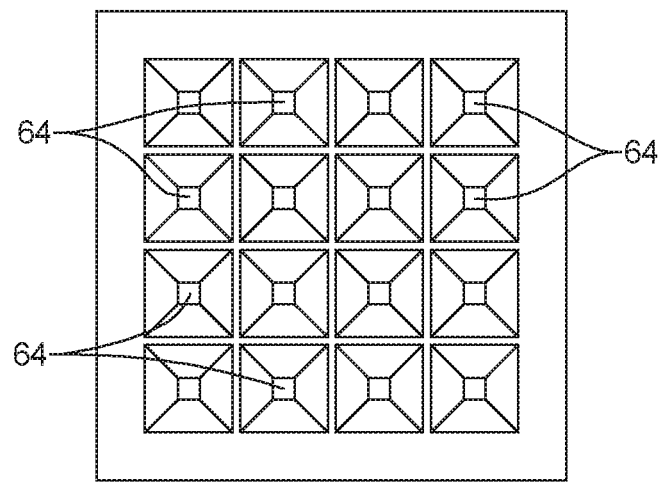
FIG. 9A is a top view of a section of square pyramid shaped tiles.
Figure 9B:
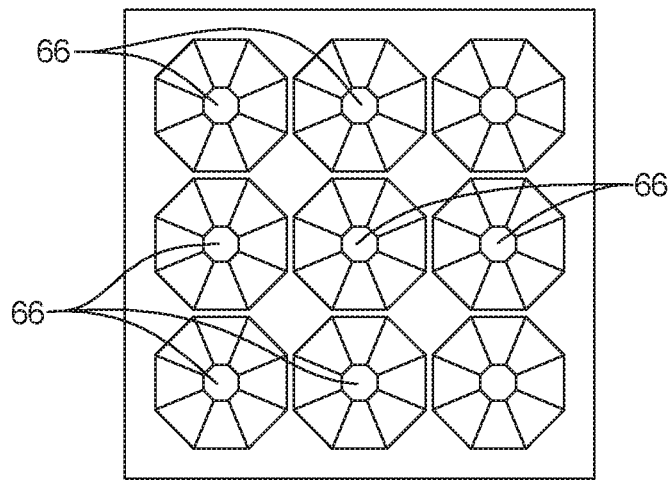
FIG. 9B is a top view of a section of octo-pyramid shaped tiles.
Figure 9C:
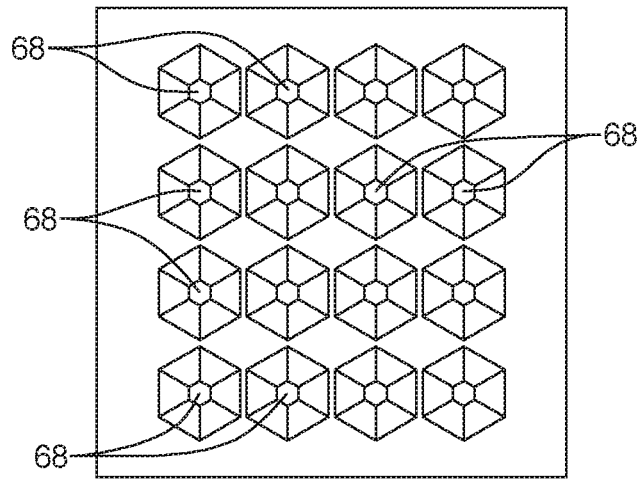
FIG. 9C is a top view of a section of truncated hex-shaped tiles.

By way of non-limiting examples, the tiles 26 may be triangular as shown in FIG. 1, FIG. 4A and FIG. 4B, the tiles 56 may be hex-shaped as shown in FIG. 5A and FIG. 5B. Referring to FIG. 6A and FIG. 6B, tiles 60 may have a complex hex-snap shape. Tiles 62 having a truncated cone shape are shown in FIG. 7. Other examples include square pyramid shaped tiles 64, as shown in FIG. 9A, octo-pyramid shaped tiles 66, as shown in FIG. 9B, and truncated hex shaped tiles 68, as shown in FIG. 9C.

In an exemplary embodiment, as shown in FIG. 2A, FIG. 2B, FIG. 3A, FIG. 3B, FIG. 5A and FIG. 5B, the tiles 26 of the first architectural layer 14 are mounted directly onto an inner surface 70 of the first airtight layer 18 of the vacuum bladder 12 and the tiles 26 of the second architectural layer 16 are mounted directly onto an inner surface 72 of the second airtight layer 20 of the vacuum bladder 12. When the membrane 10 is formed, tiles 26 are mounted onto the inner surface 70 of the first airtight layer 18, tiles 26 are mounted onto the inner surface 72 of the second airtight layer 20, and the first and second airtight layers 18, 20 are brought together and sealed around the perimeter 22.

In this instance, the first and second architectural layers 14, 16 may have flexural elements 28 interconnecting the tiles 26, as shown in FIG. 4A. Alternatively, with the tiles 26 secured directly to the inner surface 70, 72 of the vacuum bladder 12, the first and second architectural layers 14, 16 may not include flexural elements 28 like those shown in FIG. 4A. The tiles 26 may be individually mounted directly onto the inner surfaces 70, 72 of the vacuum bladder 12, wherein flexural elements 74 comprise portions of the vacuum bladder 12 that extend between the tiles 26 mounted thereon, as shown in FIG. 4B, FIG. 5A and FIG. 5B.

Referring to FIG. 6A, in another exemplary embodiment, a first architectural layer 76 includes a first intermediate layer 80 and tiles 60 of the first architectural layer 76 are mounted onto the first intermediate layer 80. A second architectural layer 78 includes a second intermediate layer 82 and tiles 60 of the second architectural layer 78 are mounted onto the second intermediate layer 82. The flexural elements 84 of the first and second architectural layers 76, 78 comprising portions of the first and second intermediate layers 80, 82 that extend between the tiles 60 mounted thereon. This configuration allows the vacuum bladder 12 to be less robust, by using a tough and flexible material for the first and second intermediate layers 80, 82 that does not necessarily need to be airtight. The vacuum bladder 12 only needs to provide an airtight capsule for the first and second architectural layers 76, 78 and does not need to be sturdy enough to support the tiles 60 directly.

The tiles 60 can be attached to the interior surface of the vacuum bladder 12 or to the first or second intermediate layers 80, 82 by any suitable fasteners or adhesives. Referring to FIG. 6B, an intermediate layer 86 of an exemplary embodiment includes a plurality of spaced holes 88 formed therein. Tiles 60 each include a base 90, and constraining elements 92 extend therefrom. As shown in FIG. 6B, the tiles 60 each include three constraining elements 92 that are inserted through three holes 88 formed in the intermediate layer 86. A securing ring 94 snaps onto the constraining elements 92, over the intermediate layer 86 to secure the tile 60 onto the intermediate layer 86.

Referring to FIG. 7, an architectural layer 96 in accordance with another exemplary embodiment includes tiles 62 that are formed directly onto the surface of the intermediate layer 96 by using additive manufacturing techniques.

A selectively rigidizable membrane 10 of the present disclosure offers several advantages. When used within an automotive vehicle 98, the selectively rigidizable membrane 10 provides a versatile cargo management tool that is easy to use and adaptable for various types of cargo 40. Referring to FIG. 8A, an automotive vehicle 98 is shown that is equipped with a selectively rigidizable membrane 10 for cargo management. As shown, when the membrane 10 is not being used, the membrane 10 can be extended across the cargo area within the automotive vehicle 98 and rigidized to provide a stable provide a privacy screen to conceal the cargo area. Alternatively, the membrane 10 could be used a divider within the cargo area. Depending on the specific characteristics of the membrane 10, the membrane 10 could also be rolled or folded and then negatively pressurized to maintain an efficient packaging size.

Figure 8B:
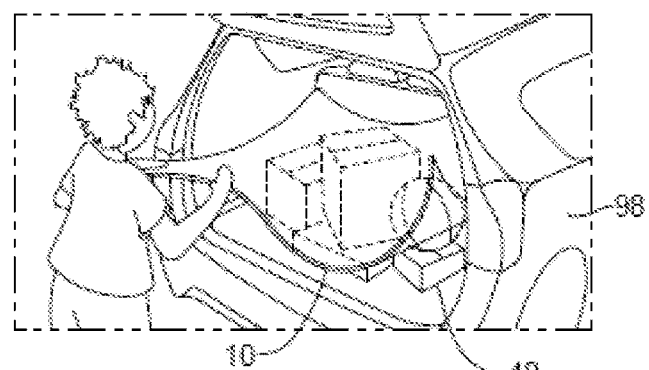
FIG. 8B is a perspective view of the automotive vehicle shown in FIG. 8A, wherein the membrane is being draped over cargo.
Figure 8C:
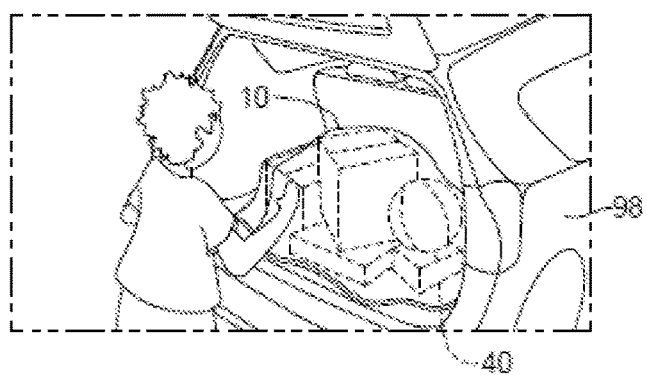
FIG. 8C is a perspective view of the automotive vehicle shown in FIG. 8A, wherein the membrane is draped over and conforms to the shape of cargo.
Figure 8D:
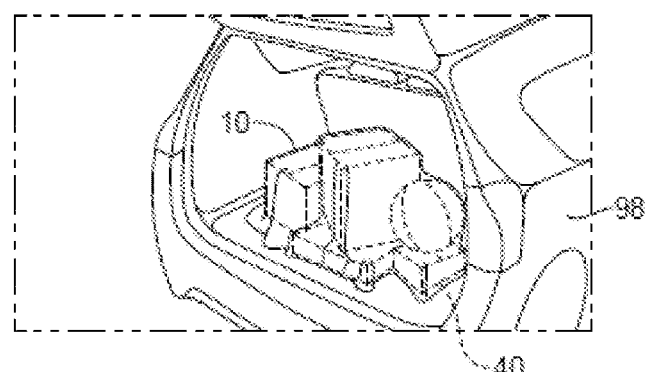
FIG. 8D is a perspective view of the automotive vehicle shown in FIG. 8A, wherein the membrane is rigidized around the cargo.

Referring to FIG. 8B, when cargo 40 is placed within the cargo area, the membrane 10 can be relaxed by removing the negative pressure applied to the vacuum bladder 12. In a flexible state, the membrane 10 can be draped over the cargo 40 and tucked closely around the cargo 40, as shown in FIG. 8C. It is possible to apply positive pressure to the vacuum bladder 12 to push the first and second architectural layers 14, 16 apart to ensure that frictional engagement and mechanical interference from constraining elements 30 is minimized making the membrane 10 flexible. Alternatively, slight negative pressure may be applied to the vacuum bladder 12 to provide a gauged level of flexibility to make the membrane 10 easier to handle and still flexible enough to conform to the cargo 40. Once the membrane 10 has been draped over the cargo 40 and tucked around the cargo 40 to conform to the general shape of the cargo 40, negative pressure is applied to the interior 24 of the vacuum bladder 12 to rigidize the membrane 10. In a rigidized state, the membrane 10 holds shape around the cargo 40 and prevents the cargo 40 from movement inside the cargo area, as shown in FIG. 8D. User interfaces on the membrane or within the vehicle near the cargo area control pneumatics that drive or revert the membrane into a different configurations and/or states.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A selectively rigidizable membrane for cargo management, comprising:
    a vacuum bladder; and
    a first architectural layer and a second architectural layer, each of the first and second architectural layers including a plurality of tiles interconnected by flexural elements;
    wherein, when atmospheric pressure is present within the vacuum bladder, the first and second architectural layers are slidably moveable relative to one another and the membrane is flexible; and
    further wherein, when negative pressure is applied to the vacuum bladder, the first and second architectural layers are forced into engagement with one another, frictional engagement of the first and second architectural layers preventing sliding movement of the first and second architectural layers relative to one another, causing the membrane to become substantially rigid.

2. The selectively rigidizable membrane of claim 1, wherein each of the tiles of the first and second architectural layers includes at least one constraining element extending therefrom, further wherein, when negative pressure is applied to the vacuum bladder, the first and second architectural layers are forced into engagement with one another, and the constraining elements of the first and second architectural layers provide mechanical interference and prevent sliding movement of the first and second architectural layers relative to one another, causing the membrane to become substantially rigid.

3. The selectively rigidizable membrane of claim 1, wherein the membrane includes at least two zones, the tiles of the first and second architectural layers within a first zone adapted to provide defined flexibility characteristics and the tiles of the first and second architectural layers within a second zone adapted to provide defined flexibility characteristics different from the first zone, the first and second zones being independently rigidizable.

4. The selectively rigidizable membrane of claim 3, wherein the tiles of the first and second architectural layers within the first zone are shaped and sized differently than the tiles of the first and second architectural layers within the second zone.

5. The selectively rigidizable membrane of claim 1, wherein the tiles of the first and second architectural layers are adapted to provide defined fold lines for the membrane.

6. The selectively rigidizable membrane of claim 1, wherein the vacuum bladder includes a first airtight layer and a second airtight layer, the first and second airtight layers being sealed to one another around along a perimeter, the first and second architectural layers being positioned between the first and second airtight layers within the perimeter.

7. The selectively rigidizable membrane of claim 6, wherein the tiles of the first architectural layer are mounted onto an inner surface of the first airtight layer of the vacuum bladder and the tiles of the second architectural layer are mounted onto an inner surface of the second airtight layer of the vacuum bladder.

8. The selectively rigidizable membrane of claim 6, wherein the first architectural layer includes a first intermediate layer, the tiles of the first architectural layer mounted onto the first intermediate layer and the second architectural layer includes a second intermediate layer, the tiles of the second architectural layer mounted onto the second intermediate layer.

9. The selectively rigidizable membrane of claim 8, wherein the flexural elements comprise portions of the first and second intermediate layers that extend between the tiles mounted onto the first and second intermediate layers.

10. The selectively rigidizable membrane of claim 8, wherein the first and second intermediate layers each include a plurality of spaced holes formed therein, the tiles of the first and second architectural layers including a base, at least one constraining element extending therefrom and a securing ring adapted to snap onto the at least one constraining element, further wherein the at least one constraining element of each tile extends through one of the holes formed within one of the first and second intermediate layers and the securing ring snaps onto the tile to secure the tile onto the intermediate layer.

11. The selectively rigidizable membrane of claim 8, wherein the tiles of the first and second architectural layers are formed onto the first and second intermediate layers by additive manufacturing.

12. The selectively rigidizable membrane of claim 1, wherein the flexibility of the membrane can be varied by varying the negative pressure that is applied to the vacuum bladder.

13. The selectively rigidizable membrane of claim 1, further including a tertiary layer positioned between the first and second architectural layers, the tertiary layer adapted to aid sliding movement of the first and second architectural layers relative to one another when negative pressure is not applied to the vacuum bladder.

14. A selectively rigidizable membrane for cargo management, comprising:
    a vacuum bladder, the vacuum bladder including a first airtight layer and a second airtight layer, the first and second airtight layers being sealed to one another along a perimeter, the first and second architectural layers being positioned between the first and second airtight layers within the perimeter;

first and second architectural layers positioned between the first and second airtight layers within the perimeter of the vacuum bladder, each of the first and second architectural layers including a plurality of tiles interconnected by flexural elements, each of the tiles of the first and second architectural layers including at least one constraining element extending therefrom;

a tertiary layer positioned between the first and second architectural layers, the tertiary layer adapted to aid sliding movement of the first and second architectural layers relative to one another when negative pressure is not applied to the vacuum bladder; and a port adapted to allow pressure to be applied to the interior of the vacuum bladder;

wherein, when atmospheric pressure is present within the vacuum bladder, the first and second architectural layers are slidably moveable relative to one another and the membrane is flexible, and when negative pressure is applied to the vacuum bladder, the first and second architectural layers are forced into engagement with one another, the constraining elements of the first and second architectural layers providing mechanical interference and preventing sliding movement of the first and second architectural layers relative to one another, causing the membrane to become substantially rigid, the rigidity of the membrane being selectively variable depending on the level of negative pressure applied to the interior of the vacuum bladder.

15. The selectively rigidizable membrane of claim 14, wherein the membrane includes a plurality of independently rigidizable zones, the tiles of the first and second architectural layers within each zone having dimensional features adapted to provide defined flexibility characteristics, wherein the flexibility characteristics of each zone vary based on the dimensional features of the tiles.

16. The selectively rigidizable membrane of claim 14, wherein the tiles of the first and second architectural layers are adapted to provide defined fold lines for the membrane.

17. The selectively rigidizable membrane of claim 14, wherein the tiles of the first architectural layer are mounted onto an inner surface of the first airtight layer of the vacuum bladder and the tiles of the second architectural layer are mounted onto an inner surface of the second airtight layer of the vacuum bladder.

18. The selectively rigidizable membrane of claim 14, wherein the first architectural layer includes a first intermediate layer, the tiles of the first architectural layer mounted onto the first intermediate layer and the second architectural layer includes a second intermediate layer, the tiles of the second architectural layer mounted onto the second intermediate layer, the flexural elements of the first and second architectural layers comprising portions of the first and second intermediate layers that extend between the tiles mounted thereon.

19. The selectively rigidizable membrane of claim 14, wherein the first and second intermediate layers each include a plurality of spaced holes formed therein, the tiles of the first and second architectural layers including a base, the at least one constraining element extending therefrom and a securing ring adapted to snap onto the at least one constraining element, further wherein the at least one constraining element of each tile extends through one of the holes formed within one of the first and second intermediate layers and the securing ring snaps onto the tile to secure the tile onto the intermediate layer.

20. The selectively rigidizable membrane of claim 14, wherein the tiles of the first and second architectural layers are formed onto the first and second intermediate layers by additive manufacturing.

* * * * *